United States Patent [19]

Jeandot

[11] 4,425,662

[45] Jan. 10, 1984

[54] SYSTEM FOR TELE-LOCATING REGENERATIVE REPEATERS

[75] Inventor: Jean-Louis Jeandot, Limours, France

[73] Assignee: Telecommunications Radioelectriques et Telephoniques T.R.T., Paris, France

[21] Appl. No.: 302,282

[22] Filed: Sep. 15, 1981

[51] Int. Cl.³ .............................................. H04B 3/46
[52] U.S. Cl. ......................................... 375/4; 375/10; 371/22
[58] Field of Search ..................... 179/175.31; 370/13, 370/15; 375/3, 4, 10; 371/22, 27, 24, 25; 340/825.07, 825.16, 825.18

[56] References Cited

U.S. PATENT DOCUMENTS

| | | | |
|---|---|---|---|
| 3,739,098 | 6/1973 | Camiciottoli et al. | 370/15 |
| 3,769,454 | 10/1973 | Liberman et al. | 370/15 |
| 4,112,263 | 9/1978 | Lender | 371/22 |
| 4,161,635 | 7/1979 | Wolaver | 370/15 |
| 4,196,321 | 4/1980 | Bosik | 370/15 |
| 4,242,750 | 12/1980 | Finck et al. | 371/22 |

*Primary Examiner*—Benedict V. Safourek
*Attorney, Agent, or Firm*—Thomas A. Briody; William J. Streeter; Edward W. Goodman

[57] ABSTRACT

A transmission path between two terminal stations for transmitting digital information signals at a predetermined rate in one direction via a forward path and in the other direction via a return path. The transmission path comprises regenerative repeaters. A system for tele-location of these repeaters comprises in one of the terminal stations a transmitter for transmitting tele-location commands to the repeaters via the forward path, carrier signals of the said rate being on-off modulated in this transmitter by an amplitude modulator in accordance with output signals of a command sequence generator, and further comprises in every repeater a loop circuit between forward and return paths having an associated control circuit which cooperates with a detector for detecting the presence of carrier signals in the return path and for receiving tele-location commands.

9 Claims, 13 Drawing Figures

SYSTEM FOR TELE-LOCATING REGENERATIVE REPEATERS

The invention relates to a system for telelocating regenerative repeaters which are included in a transmission path between two terminal stations for transmitting at a predetermined rate digital information signals in one direction via a forward path and in the other direction via a return path. One of the terminal stations comprises a tele-location transmitter for transmitting telelocation commands to the repeaters via the forward path. The terminal station transmitter comprises a generator for generating carrier signals at the predetermined rate and an amplitude modulator for on-off modulation of said carrier signals in accordance with output signals of a command sequence generator. Each repeater comprises a loop circuit arranged between the forward path and the return path and is associated with a control circuit cooperating with a detector for detecting the presence of carrier signals in the forward path. The loop circuit receives said tele-location commands.

BACKGROUND OF THE INVENTION

The prior art systems for the remote locating of the repeaters may be distinguished by two types, a first type in which a unique address is assigned to each repeater, and a second type in which such an address is not used.

A system of the first type is described in German Patent Specification No. 22 15 836 issued June 28, 1973. In this known system the address consists of a unique frequency assigned to each repeater. This frequency is obtained in the tele-location transmitter by a suitable choice of the signals for the on-off modulation of the carrier signals. Recognition of the said frequency in a repeater then accomplishes looping of the forward and return paths. One disadvantage of this type of system is the use of filters for the frequency detection, as filters are usually bulky circuits having a delicate tuning. A second disadvantage also results from the use of filters and resides in the fact that said filters must be tuned in a manner which is different for every repeater, which seriously hampers the installation of the repeaters.

A system of the second type is disclosed in German "Auslegeschrift" No. 26 53 201 issued Aug. 31, 1978. In essence, said prior art system employs two kinds of signals: the signals of the first type are preparatory signals which are transmitted to make the regenerators included in the repeaters suitable for receiving the signals of the second type, which form loop commands. One disadvantage of this system resides in the fact that two kinds of signals must be generated and recognized in each individual repeater. A second disadvantage is that each repeater must be provided with a separate transmitter for retransmitting the preparatory signals to the following repeater.

It is an object of the invention to provide a tele-locating system defined in the preamble which belongs to the said second type of system but does not have the disadvantages mentioned above.

SUMMARY OF THE INVENTION

According to the invention, the system for the tele-location of repeaters is characterized in that the command sequence generator is arranged for applying to the control circuits of the repeaters command sequences which are each formed by a pulse train having at least one pulse, which pulses are transmitted by interrupting the carrier signals by means of the amplitude modulator.

The invention is based on the recognition of the fact that the interruptions of the carrier signals are converted into pulses by the carrier detector and that it is thus possible to control looping and unlooping of the repeaters by pulse trains with the aid of control circuits having a simple structure which need only process pulses.

BRIEF DESCRIPTION OF THE DRAWINGS

The invention and its advantages will now be further described by way of example with reference to embodiments shown in the accompanying drawings, in which.

DETAILED DESCRIPTION OF THE PREFERRED EMBODIMENTS

Figure 1:
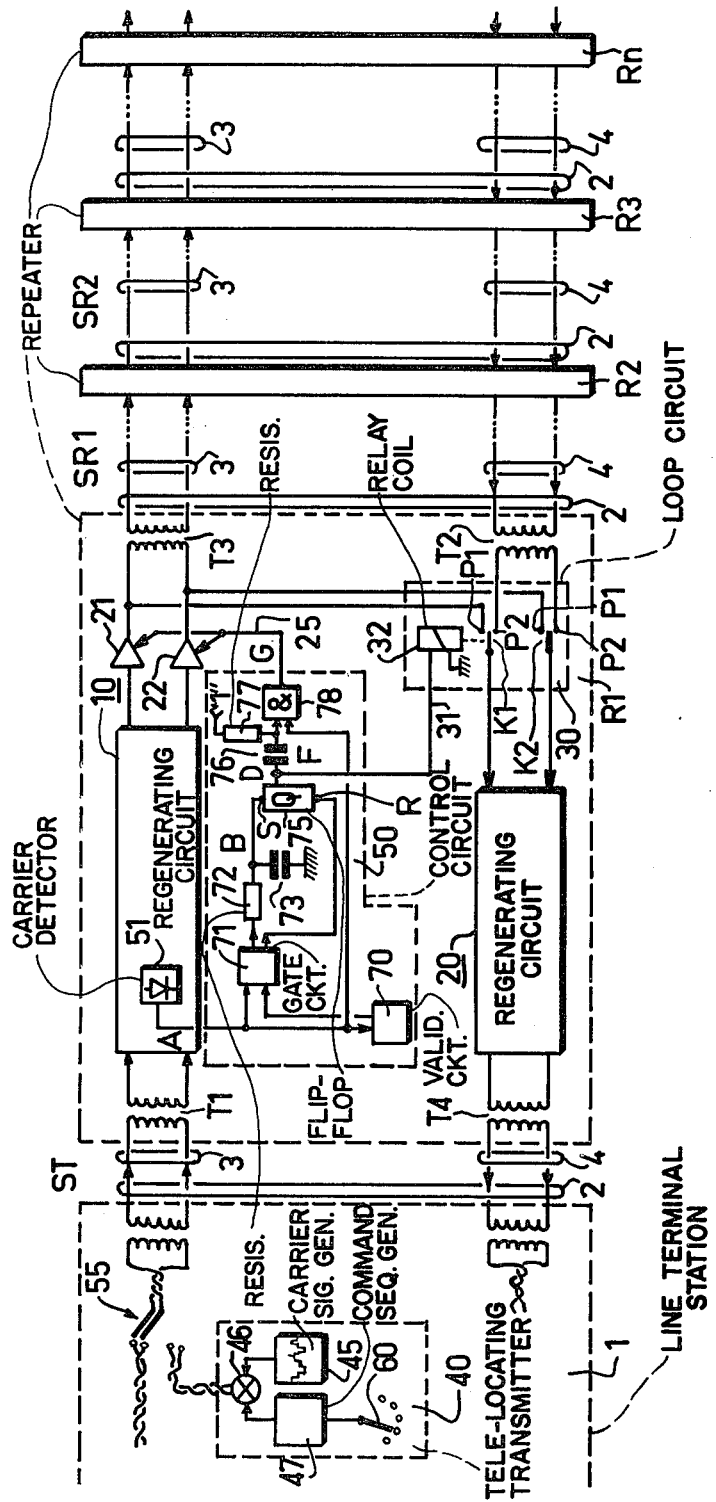
FIG. 1 shows a simplified block diagram of a tele-locating system in accordance with the invention.

In FIG. 1, a line terminal station 1 is connected to a transmission path 2 in the form of a cable, wherein n repeaters R1, R2, R3, . . . Rn are included. This cable has two pairs of conductors 3 and 4, the pair 3 forming the path in the forward direction and the pair 4 the path in the return direction, both considered from line terminal station 1. The repeaters R1, R2, R3, . . . Rn have identical structures and only repeater R1 is shown in greater detail in FIG. 1. Repeater R1 comprises two input transformers T1 and T2, and two output transformers T3 and T4, for the respective connections to the forward and return paths. The transformers T1 and T3 are interconnected by a regenerating circuit 10 and the transformers T2 and T4 are interconnected by a regenerating circuit 20. The structure of these regenerating circuits and the several signal processing operations performed therein are well known to a person skilled in the art and need no further explanation. The regenerating circuits used in FIG. 1 are formed by an integrated circuit described in the article "Equipment de ligne numérique à 2 Mbit/s de deuxième génération" published in "Cables & Transmission", No. 2, April 1978. In FIG. 1, two amplifiers for regenerating circuit 10 are shown separately, these amplifiers 21, 22 having for their object to amplify the signals of each polarity for the forward path 3 and have an inhibiting input which is connected with a conductor 25. In addition, repeater R1 comprises a loop circuit 30 which, for the sake of simplicity, is shown in FIG. 1 as a relay having two contacts K1, K2 and two positions P1, P2, which relay is energized by a signal which is passed to its energizing coil 32 via a conductor 31. When the contacts K1, K2 are in the position P1, looping of repeater R1 occurs, that is to say the outputs of amplifiers 21, 22 are connected to the input of regenerating circuit 20, and when the contacts K1, K2 are in the position P2, the input of regenerating circuit 20 is connected to the return path 4 via transformer T2. To energize the relay in loop circuit 30 of repeater R1 tele-locating commands are transmitted via the forward path 3, which commands are supplied by a tele-locating transmitter 40 in line terminal station 1.

In the above-described example binary information is transmitted at a rate of 2.048 Mbit/s by means of the line code HDB3.

Figure 2:
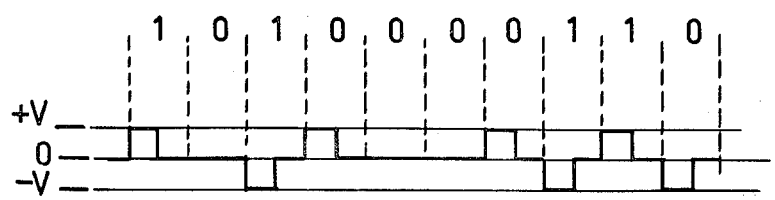
FIG. 2 shows the form of the transmitted signal for a binary sequence which is converted in accordance with the code HDB3.

FIG. 2 shows a sequence of binary elements "1", "0", "1", "0", "0", "0", "0", "1", "1", "0", . . . which are transmitted in accordance with this code. This transmitted signal may assume three possible values $+V$, O, $-V$; in addition each binary element has a duration T of 488 ns.

The tele-location transmitter 40 comprises a carrier signal generator 45 whose rate corresponds to the normal transmission rate of 2.048 Mbit/s, and an amplitude modulator 46 for on-off modulation of the said carrier signals in accordance with the output signals of a command sequence generator 47. In addition, repeater R1 for the control of loop circuit 30 and likewise all the other repeaters, includes a control circuit 50, which cooperates with a detector 51 forming part of regnerating circuit 10. This detector 51 detects the presence of a carrier on the forward path.

Figure 3:
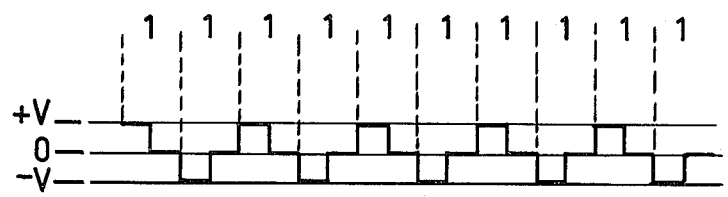
FIG. 3 shows the form of a carrier signal employed in the system of the invention.

In the event of transmission by means of the line code HDB3, the carrier signal is obtained in a simple way by continuously transmitting the binary element "1", which results in a signal that is rich in transitions which can be easily discerned in the repeaters: the shape of the signal at the output of generator 45 is shown in FIG. 3. The duration of each binary element "1" is of course also equal to 488 ns.

The tele-locating transmitter 40 is used in practice only when an unsatisfactory transmission on line path 2 has been detected. The output signals of transmitter 40 are then applied to the line path 2 by means of a switch 55, which is adjusted to such a position that forward path 3 of line path 2 can receive the signals from transmitter 40.

After a start up sequence S0 command sequence generator 47 produces three sequences S1, S2 and S3. The first sequence S1 is a validation-sequence to make the control circuits 50 suitable for receiving the next sequences S2 and S3. The second sequence S2 is a looping-sequence, that is to say that a loop is formed in all repeaters receiving said sequence S2; it should be noted that at that moment repeater R1 may be tested. The third sequence S3 is an unlooping-sequence, that is to say that in a selective manner, one after the other, the repeaters R1, R2, R3, . . . , Rn can be unlooped in order to test the repeaters R2, R3, . . . , respectively. The desired number of repeaters to be unlooped is adjusted by means of a keyboard switch 60 of generator 47.

Figure 4:
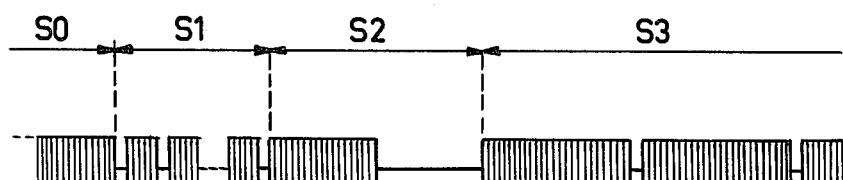
FIG. 4 shows an example of the manner in which the command sequences are transmitted.

FIG. 4 illustrates the manner in which said sequences appear. During the sequence S0, a series of binary elements "1" is transmitted through forward path 3 during some tens of milliseconds to stabilize the operation of the valid repeaters. This series of binary elements "1" forms the carrier signal after having been converted into the line code HDB3. During the validation-sequence S1 the transmission of the carrier signal is interrupted 64 times, each interruption having a duration of 0.5 ms; these carrier interruptions are performed at equidistant instants spaced at a time interval of 4 ms.

This sequence S1 is difficult to imitate, that is to say it clearly differs from the normally transmitted digital information signals. Thus, loop circuit 30 is prevented from establishing an untimely connection between forward path 3 and return path 4. For greater certainty, means (which will be described hereinafter) are provided in control circit 50 so that in the event that in spite of everything imitation might occur, the loop then established will automatically disappear after a predetermined period of time.

During the looping-sequence S2 the carrier signal is interrupted for a long period of time which may be longer than or equal to 4 ms.

Figure 5:
FIG. 5 shows the form of the signal at the output of the carrier detector when command sequences of FIG. 4 are employed.

The unlooping-sequence S3 consists of short carrier interruptions of 0.5 ms, the number of which depends on the number of repeaters to be unlooped. In response to the command sequence signals transmitted over the forward path, detector 51 will produce a logic signal A which is shown in FIG. 5 relative to FIG. 4. In the presence of the carrier, logic signal A assumes the value "1" and in the absence of the carrier the value "0".

This signal A is applied to control circuit 50. This circuit 50 comprises a validation circuit 70, which after receipt of the validation-sequence produces a logic signal "1" during a predetermined time of some seconds. As a result thereof, a gate circuit 71 is set to its conductive stage, so that signal A can be passed via a first output of gate circuit 71 to an integrating network in the form of a resistor 72 having value R and a capacitor 73 having value C, and a signal A which appears at a second output of gate circuit 71, may be transmitted to the R-input of a flip-flop 75 of the RS-type; as is known such a flip-flop may be in the form of two NAND-gates. The S-input of this flip-flop 75 is connected to the integrating network, that is to say to the common junction of resistor 72 and capacitor 73.

The other end of resistor 72 is connected to the first output of gate circuit 71, while the other end of capacitor 73 is connected to a voltage reference point (ground). In the non-valid condition, circuit 70 produces a logic signal "0"; then a logic "1" occurs at the first output of gate circuit 71 and a logic "0" at the second output. The state of flip-flop 75 is then perfectly defined.

The Q-output of the flip-flop 75 is connected to conductor 31 and also to a differentiating network in the form of a capacitor 76 having value C' and a resistor 77 having value R'. The ouput of this differentiating network is connected to one input of an AND-gate 78 having two inputs, the other input being connected to the output of carrier detector 51.

The output of the differentiating network is formed by the common junction of capacitor 76 and resistor 77. The other end of capacitor 76 is connected to the Q-output of flip-flop 75 and the other end of resistor 77 is connected to a fixed voltage source which represents a signal having logic value "1". The output of AND-gate 78 is connected to conductor 25.

The operation of control circuit 50 in different circumstances will now be further explained with reference to the signal A and the signals B, D, F and G which occur at the output of integrating network 72, 73, at the Q-output of flip-flop 75, at the output of differentiating network 76, 77 and on conductor 25.

In the following description it is assumed that validation circuit 70 has already been excited and produces a logic signal "1".

Figure 6:
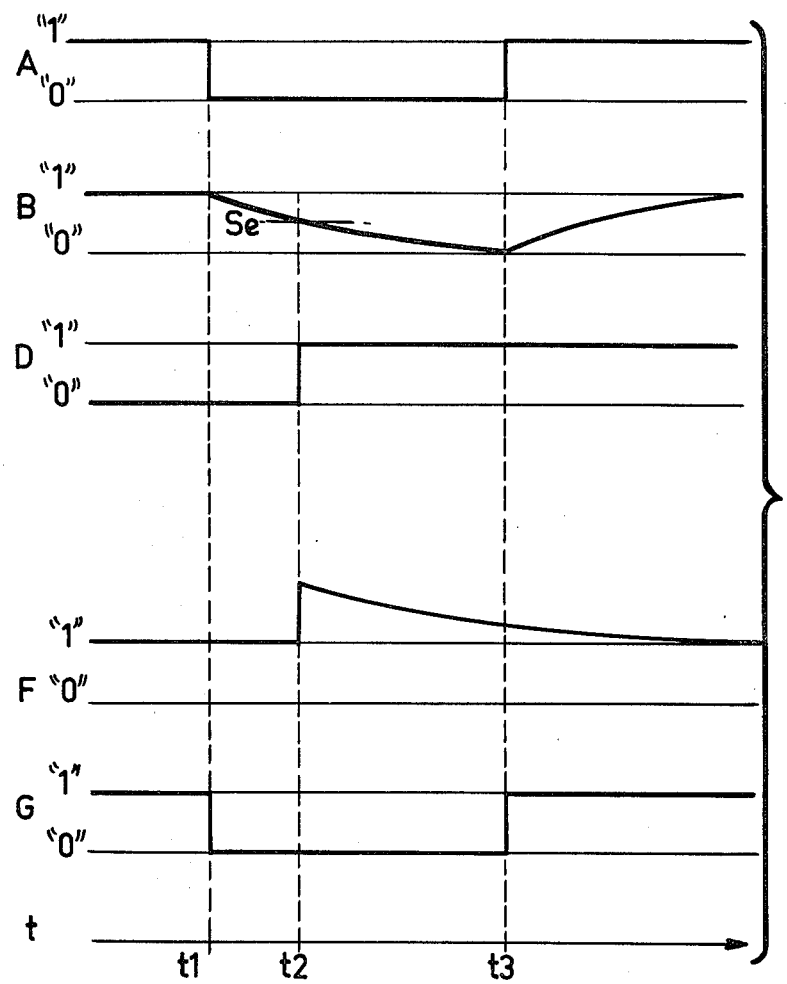
FIG. 6, FIG. 7, FIG. 8 and FIG. 9 illustrate the behaviour of the signals in the control circuit of a repeater in different circumstances.

With reference to FIG. 6 it will be described how control circuit 50 responds to the interruption of the carrier during the sequence S2. It is assumed that t1 is the instant at which this carrier interruption occurs. Prior to instant t1, signal A and signal B have the value "1", signal D has the value "0" which is imposed by the last interruption of sequence S1, signal F has the value "1" and signal G has also the value "1". When signal G has the value "1", the amplifiers 21 and 22 are not blocked. After instant t1, signal A assumes the value "0" and as a result gate circuit 78 is immediately set to its non-conductive state so that also signal G assumes the value "0", signal B then starts decreasing at a rate which depends on the value of the time constant RC, until at an instant t2 signal B has reached a value which corresponds to a logic value "0", taking account of the value of the threshold Se of the circuits employed. Flip-flop 75 then changes state and signal D at its Q-output assumes the value "1". The transition from the value "0" to the value "1" in signal D causes a sudden increase of signal F, which in response thereto presents a voltage peak, but does not loose its logic value "1". At instant t3, signal A again assumes the value "1" so that signal G also assumes the value "1" again.

Thus, control circuit 50 accomplishes that the long carrier interruption occurring after the validation-sequence S2 is passed on unmodified to the next repeater. It should be noted that when signal D has a value "1", this means that the repeater is in the loop condition and consequently that the forward path is connected to the return path.

Figure 7:
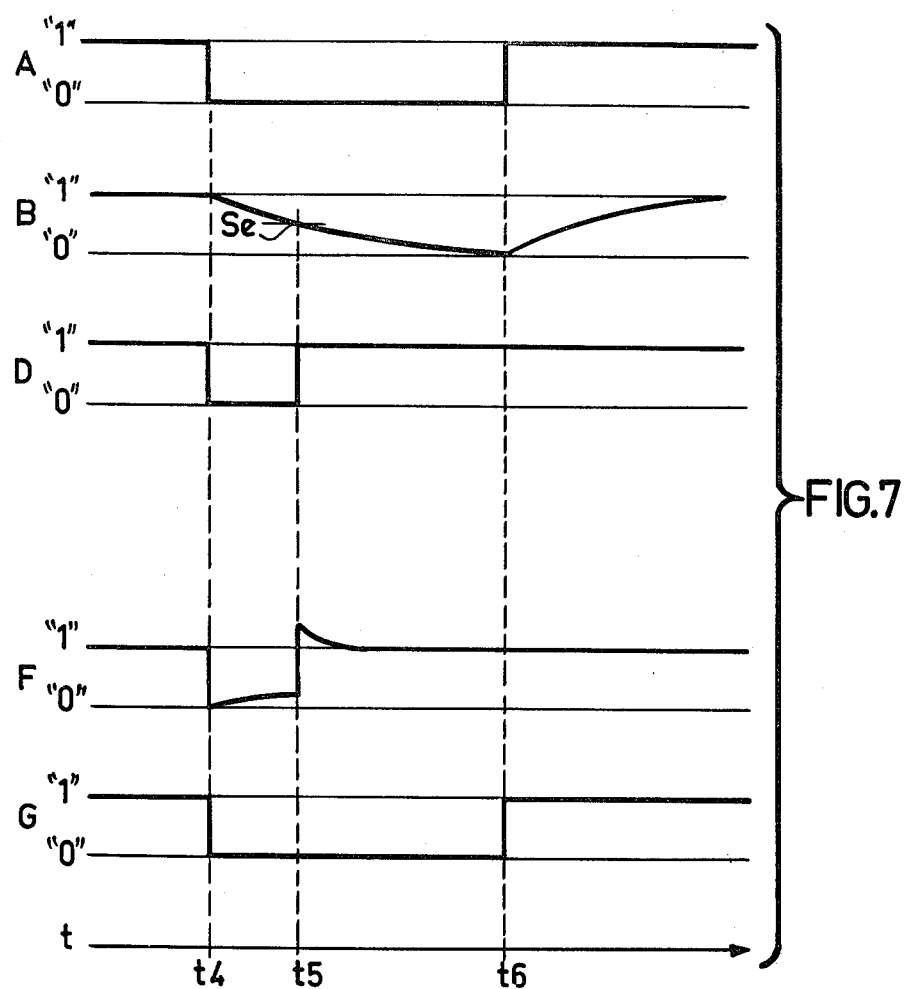

Now, with reference to FIG. 7, there follows a description of a long carrier interruption, which is comparable to the preceding interruption during the sequence S2, but the repeater being in the loop condition. This carrier interruption occurs at an instant t4. Prior to this instant t4, all values of the considered signals are equal to those prior to the instant t1 (see FIG. 6), but with the exception of course of signal D which has the value "1" just prior to instant t4. From instant t4 onwards signal D assumes the value "0", which also holds for the signals G and F, and the value of signal B decreases until, at an instant t5, the value of the threshold Se is reached so that signal B is thereafter assumed to have the value "0", causing flip-flop 75 to change state, that is to say that signal D assumes the value "1" after instant t5. It should, however, be noted that the rate at which the value of signal B decreases exceeds the rate at which the value of signal F increases. When at instant t5 signal D changes from the value "0" to the value "1", signal F immediately assumes this value "1", AND-gate 78 then being in the conductive state. So when signal A assumes the value "1" at an instant t6, also signal G assumes this value "1" as a result thereof.

Summarizing the above, when a repeater is in the loop condition and when this repeater receives a command pulse (carrier interruption) of a long duration, this command pulse is forwarded as such and this repeater remains in the loop condition.

Figure 8:
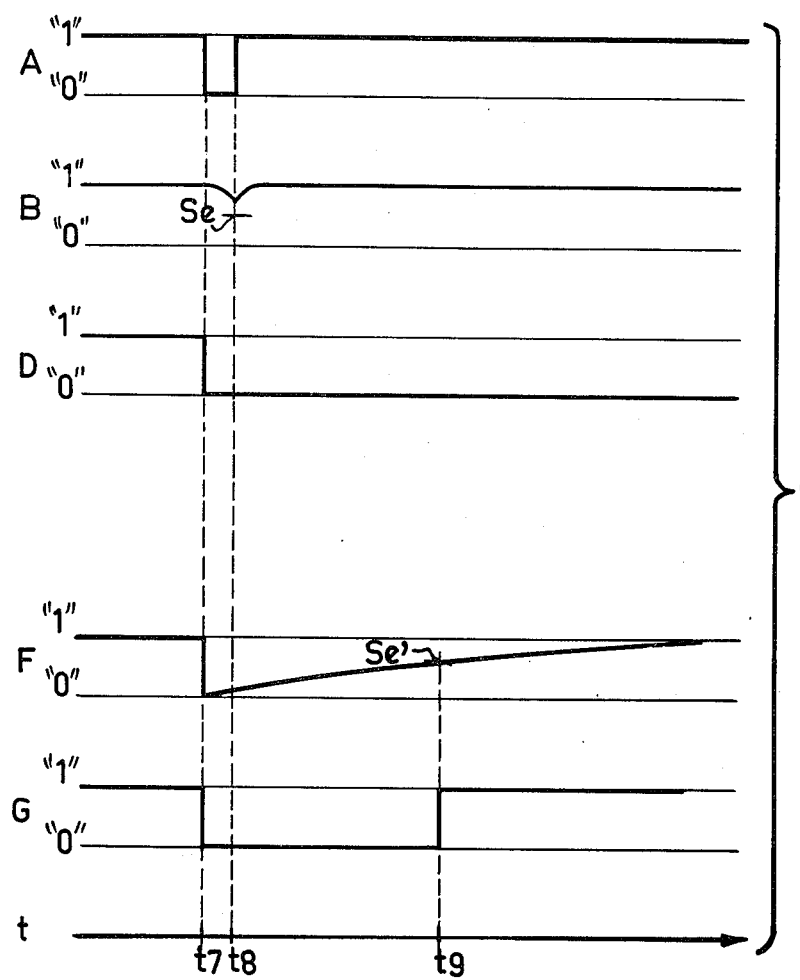

Now, with reference to FIG. 8, the behaviour of the system will be described for the event that a carrier interruption of short duration is received by a repeater in the loop condition.

These carrier interruptions occur during the unlooping-sequence S3. This carrier interruption manifests itself in that signal A assumes the value "0" at an instant t7. Prior to this instant t7, the signals B, F and G have the value "1", as has also signal D, for the repeater is then in the loop condition. When at this instant t7 signal A assumes the value "0", this causes flipflop 75 to change state, so that signal D then assumes the value "0" and the repeater is unlooped. This change in value is then immediately passed on by the differentiating network 76, 77, so that signal F then immediately assumes the value "0", and starts to increase thereafter. In its turn, signal B starts decreasing, but at an instant t8 signal A assumes the value "1" again, causing signal B to return to the value "1" without having reached the threshold value Se. So flip-flop 75 does not change state and signal D keeps the value "0". Signal F starts to increase and at a predetermined instant t9 signal F reaches a threshold value Se, at which it is assumed that signal F has the value "1"; AND-gate 78 is then rendered conductive and the value "1" of signal A is passed on, so that signal G assumes the value "1" at instant t9.

The repeater which is in the loop condition and receives a short unlooping pulse (carrier interruption) is unlooped and in its turn transmits a long blocking pulse (carrier interruption).

Figure 9:
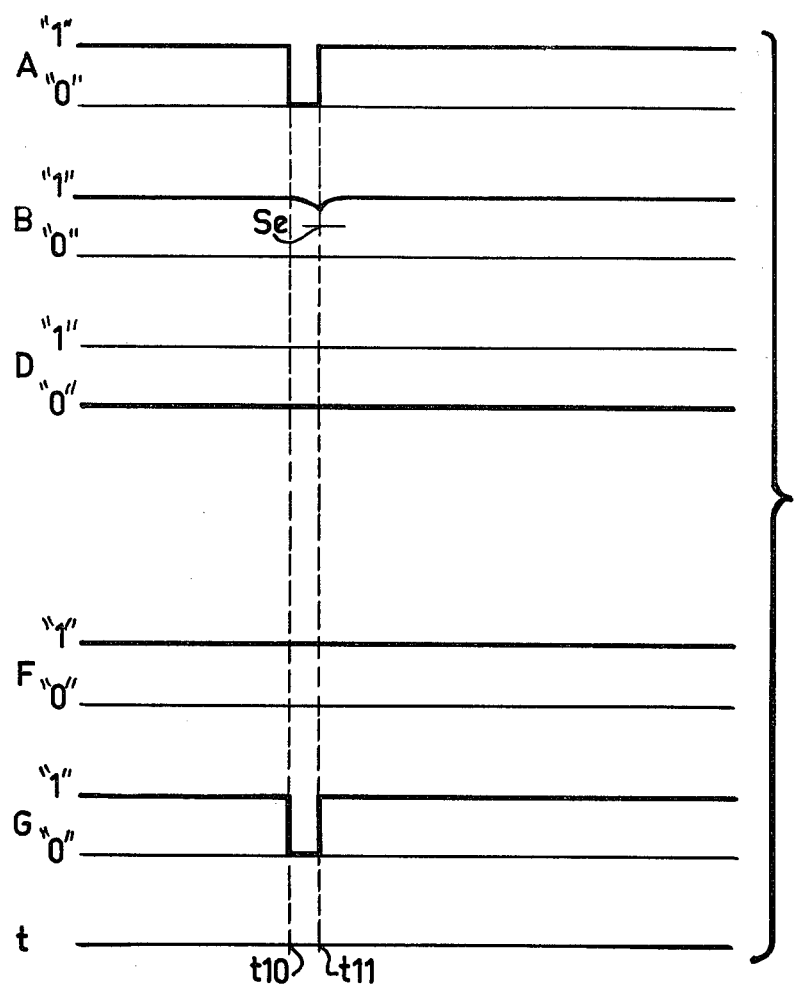

The behaviour of the system for the event that a carrier interruption of a short duration is received by a repeater which has just been brought in the unlooped condition will now be explained with reference to FIG. 9. This carrier interruption occurs at an instant t10. Prior to this instant, the signals A, B, F and G have the value "1" and signal D has the value "0", so that when signal A assumes the value "0" at instant t10, this does not have any influence on flip-flop 75 and signal D keeps the value "0". Since signal F has the value "1", signal G follows the value of signal A. This interruption is short relative to the time constant RC, so that signal B does not have sufficient time to reach the threshold value Se at instant t11 at which signal A again assumes the value "1". Since AND-gate 78 remains conductive, signal G reproduces the changes in the value of signal A.

A repeater which is in the unlooped condition and receives a short carrier interruption remains in the unlooped condition and passes this brief command pulse unmodified to the next repeater.

Figure 10:
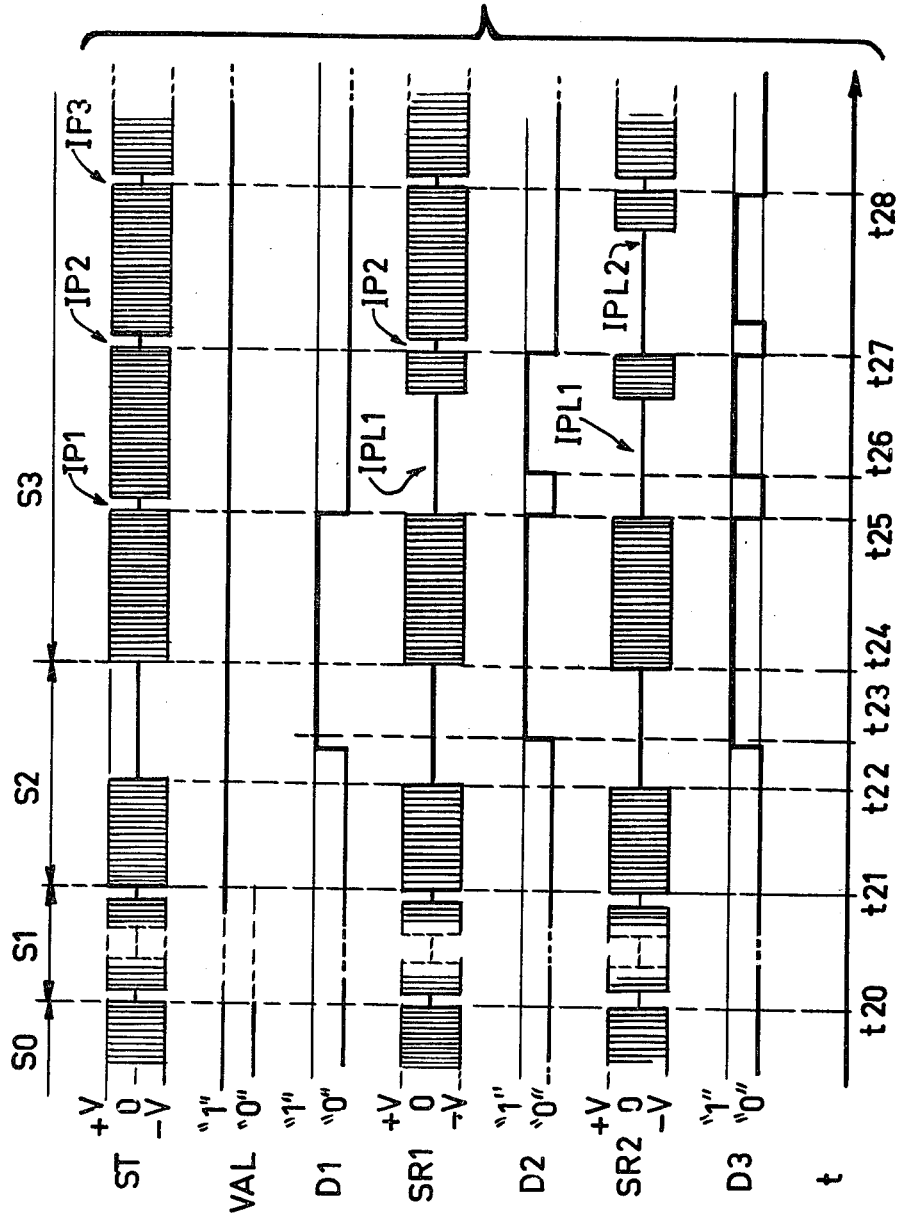
FIG. 10 shows a number of signals to explain the operation of the system of the invention.

It is now possible to describe the operation of the tele-locating system of the invention in a simple way with reference to FIG. 10. In FIG. 10, ST is the signal at the output of line terminal station 1, SR1 is the signal at the output of repeater R1 and SR2 the signal at the output of repeater R2. Signal VAL in FIG. 10 is the validation signal which will not be shown for every repeater. In addition, FIG. 10 shows the signals D1, D2 and D3 which control looping and unlooping within the repeaters R1, R2 and R3, respectively.

Signal ST is shown already in FIG. 3, as are also the different command sequences S0, S1, S2 and S3.

Validation signal VAL changes to the value "1" during the sequence S1 which starts at instant t20 (at which the sequence S0 stops) and stops at instant T21 (at which the sequence S2 starts). The sequences S0 and S1 are found back unmodified in the signals SR1 and SR2. When at instant t21 in the sequence S2 the long interruption of the carrier signal starts, this carrier interruption causes looping of the repeaters which can receive the sequence S2. This looping operation is not of necessity performed simultaneously, which otherwise does not negatively affect the operation of the system. It may, however, be assumed that at an instant t23 these repeaters are in the looped condition and that then the signals D1, D2 and D3 assume the value "1". From that instant onwards repeater R1 may be tested, as mentioned in the foregoing.

The sequence S3 starts at instant t24. A first short carrier interruption IP1 appears at instant t25. In the region of repeater R1 this interruption IP1 has a double effect: on the one hand IP1 cause unlooping of this repeater and on the other hand IP1 causes the carrier in this repeater to be blocked in such a way that the brief interruption IP1 is converted into an interruption of a long duration IPL1. The long carrier interruption IPL1 will effect looping of the repeater R2 at the instant t26; signal D2 which assumed the value "0" at instant t25 then assumes the value "1" again. This interruption IPL1 will be transmitted to all the repeaters so that they will be in the looped condition. After instant t26 it is possible to test repeater R2.

At an instant t27 a second short carrier interruption IP2 of the sequence S3 appears at the output of line station 1. This interruption IP2 is transmitted as such by repeater R1 and will be converted into a long interruption IPL2 by repeater R2. This long interruption IPL2 will thus be transmitted to all the following repeaters. So the interruption IP2 causes unlooping of repeater R2 so that it is then possible to test repeater R3. The third short carrier interruption IP3 appearing at an instant t28 will then unloop repeater R3 in the manner described in the foregoing, so that the test of the repeater after R3 can be performed, this interruption IP3 being transmitted as such by the repeaters R1 and R2.

The number of short carrier interruptions transmitted by tele-locating transmitter 40 during the sequence S3 thus determines the number of repeaters to be unlooped.

Figure 11:
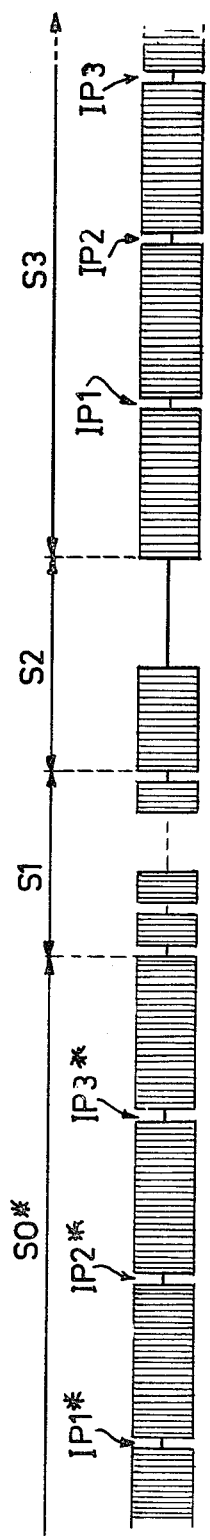
FIG. 11 shows an example of the command sequences employed in practice.

A sequence S0* may be substituted for start up sequence S0. This sequence S0* is shown in FIG. 11, in combination with the sequence S1, S2 and S3, and includes short carrier interruptions IP1*, IP2*, IP3* of the same nature and in the same number as the carrier interruptions IP1, IP2 and IP3. As mentioned in the foregoing, this number is equal to the number of repeaters one wants to unloop. The importance of such a sequence S0* resides in the fact that this sequence ensures that all the repeaters located upstreams (that is to say in the direction towards line terminal station 1) of the repeater to be tested have indeed been unlooped and have so irrespective of the logic state of the control circuits in the upstream repeaters. Thus, validation-sequence S1 will be properly observed and certainty will be obtained about the duration of the validation, as will be explained hereafter.

Figure 12:
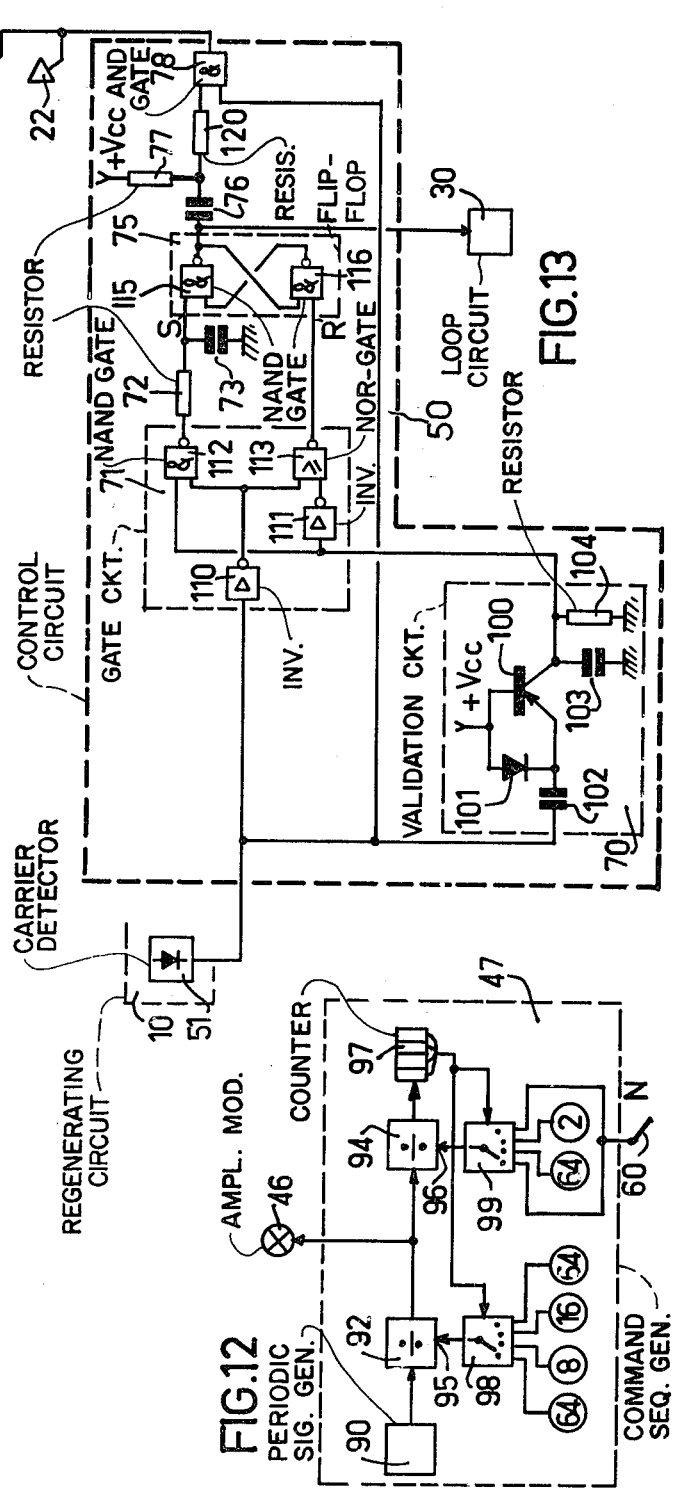
FIG. 12 shows an embodiment of the command sequence generator.

The embodiment shown in FIG. 12 of the command sequence generator 47 in line terminal station 1 comprises a generator 90 generating periodic signals which determine the different elementary instants for the sequences to be formed. The output of generator 90 is connected to the input of a first divider 92 the output of which is connected to the input of a second divider 94. The output of divider 92 constitutes the output of command sequence generator 47. These dividers 92 and 94 are variable dividers, that is to say that the frequency of the signals at their outputs is equal to the frequency of the signals at their inputs divided by a number present at their control inputs 95 and 96. Different numbers may be applied to the control inputs 95 and 96. For example, the numbers "64", "8", "16", "64" may be applied to input 95 while a number N representing the number of repeaters to be unlooped may be applied to input 96, this number N being adjusted by keyboard switch 60. In addition, also the numbers "64" and "2" may be applied to input 96. A counter 97 counts the pulses in the output signal of divider 94 and sequentially controls two switches 98 and 99 in such a way that the divisions with different dividends are sequentially performed.

The sequence S0* is formed in the following manner. On the one hand, a division by "64" is performed in divider 92 and on the other hand a division by "N" in divider 94. The signal at the output of command sequence generator 47 becomes active as soon as "64" elementary instants have been counted. This is repeated "N" times, whereafter there appears at the output of divider 94 a pulse which causes the content of counter 97 to be increased one step, in response to which the transition to the next sequence takes place.

This next sequence is the validation-sequence S1 which is formed when the number "8" occurs at input 95 of divider 92 and the number "64" at input 96 of divider 94. Thus, a carrier interruption having an elementary duration will take place once in each group of eight elementary instants. This is repeated 64 times, whereafter the transition to sequence S2 takes place.

The looping-sequence S2 is formed when the number "16" occurs at input 95 of divider 92 and the number "2" at input 96 of divider 94.

The unlooping-sequence S3 is thereafter formed in a similar manner as sequence S0*.

Figure 13:
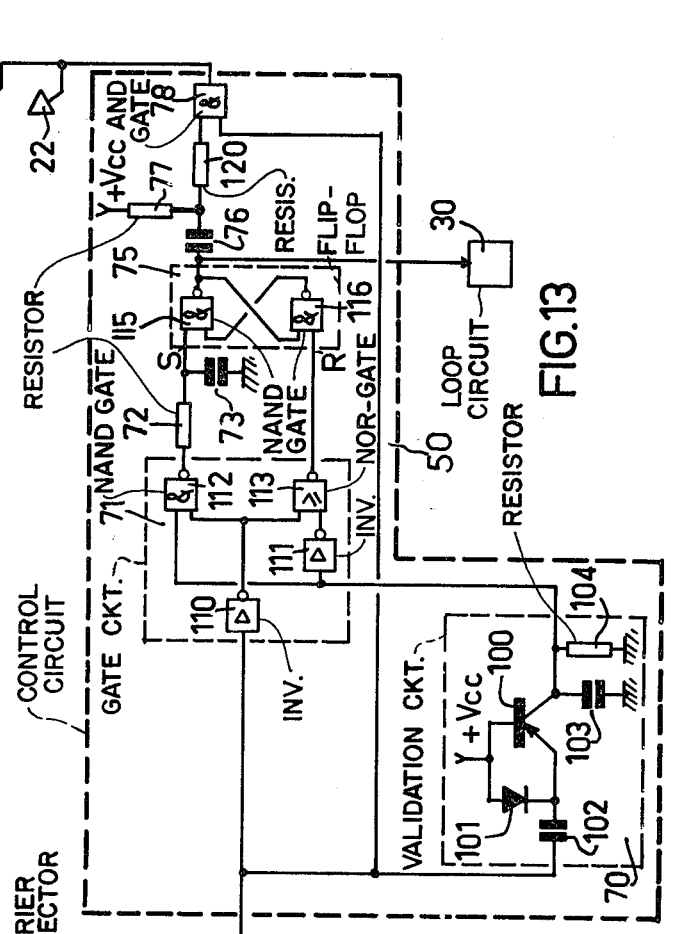
FIG. 13 shows a preferred embodiment of the control circuit in a repeater.

FIG. 13 is a schematic representation of a practical embodiment of control circuit 50 of the repeaters. In the first place, FIG. 13 shows in detail validation circuit 70 which is formed on the basis of the circuit known in the technique as a "diode-transistor pump". So this circuit 70 comprises a PNP-transistor 100 with a diode 101, whose anode is connected to the base of transistor 100 and whose cathode is connected to the emitter. The emitter of transistor 100 is connected to the output of carrier detector 51 in regenerating circuit 10 via a capacitor 102 having capacitance C1. The collector of transistor 100 constitutes the output of circuit 70 and is connected to a voltage reference point (ground) via a capacitor 103 having capacitance C2 which is shunted by a resistor 104 having value R2. A voltage Vcc is applied between the base of transistor 100 and the voltage reference point (ground).

The carrier interruptions produce a voltage of "0" volt at the output of detector 51, while the presence of the carrier results in a voltage of Vcc volt. Thus, at every carrier interruption capacitor 102 is charged to a voltate Vcc, thereafter in the presence of the carrier a charge transfer from capacitor 102 to capacitor 103 occurs, so that the voltage at the terminals of capacitor 103 will increase by a quantity which is proportional to the ratio C1/C2 and to the voltage Vcc. When the voltage across capacitor 103 reaches a predetermined threshold value this voltage is considered as a logic value "1". Resistor 104 is chosen so that the time constant R2, C2 is large relative to the period of the interruptions during the validation-sequence S1. This resistor 104 makes it possible to have the validation signal decrease to the value zero after a predetermined period of time. As a result thereof interventions are avoided if during a normal transmission of information the validation-sequence is imitated. It is also important that the validation signal has the predetermined duration. To ensure this it is necessary that the capacitor 103 is well-charged. This implies that all carrier interruptions are properly received by the repeater which comprises this control circuit 50. The importance of the use of the above-described sequence S0* will then be clear.

In FIG. 13, the gate circuit 71 of control circuit 50 is formed by two inverters 110 and 111, a NAND-gate 112 and a NOR-gate 113. The output of NAND-gate 112 is connected to the input of the integrating network in the form of resistor 72 and capacitor 73, while the output of NOR-gate 113 is connected to the R-input of flip-flop 75, which itself is formed by two NAND-gates 115 and 116. One input of the gates 112, 113 is connected to the output of detector 51 via an inverter 110; the other input of NAND-gate 112 is directly connected to the output of validation circuit 70 and the other input of NOR-gate 113 is connected to the output of validation circuit 70 via an inverter 111. In addition, a protection resistor 120 is provided between the output of the differentiating network (in the form of capacitor 76 and resistor 77) and the input of AND-gate 78.

In the regenerating circuits of the conventional type, there are often provided amplitude detectors for the signals present on the path to which the circuit is connected. These regenerating circuits may also comprise a detector for producing a signal which indicates the presence of regenerated clock signals. Within the frame work of the invention it is advantageous to use either the amplitude detector or the last-mentioned presence detector as a carrier detector.

What is claimed is:

1. A system of tele-locating regenerative repeaters which are included in a transmission path between two terminal stations for transmitting at a predetermined rate digital information signals in one direction by means of a forward path and in the other direction by means of a return path, one of the terminal stations comprising a tele-location transmitter for transmitting tele-location commands to the repeaters by means of the forward path, the transmitter comprising a regenerator for generating carrier signals at the predetermined rate, a command sequence generator and an amplitude modulator for on-off modulation of said carrier signals in accordance with output signals of said command sequence generator, and each of said repeaters comprising, arranged between said forward path and said return path, a loop circuit comprising an associated control circuit and a detector, said associated control circuit cooperating with said detector for detecting the presence of carrier signals in the forward path for receiving said tele-location commands, said command sequence generator being arranged for applying to said control circuits of said repeaters command sequences which are each formed by a pulse train having at least one pulse, which pulse train is transmitted by interrupting said carrier signals by means of said amplitude modulator.

2. A tele-location system as claimed in claim 1, in which said command sequence generator is arranged to produce at least three command sequences, the first sequence having for its object to adjust said control circuits which can receive said first sequence to a valid condition, the second sequence to cause said control circuits in the valid state to establish a connection between forward and return paths by means of said loop circuit, and the third sequence to cause said control circuit which receives this third sequence to interrupt a connection between forward and return paths by means of said loop circuit, said first sequence being in the form of a pulse train having a plurality of periodic pulses the duration of which is short relative to the period, said second sequence being in the form of one pulse the duration of which is long relative to the duration of the pulses of the first sequence, said third sequence being in the form of a sequence having N pulses of a short duration, N being the number of repeaters to be unlooped.

3. A tele-location system as claimed in claim 2, wherein said command sequence generator is arranged for producing prior to said first sequence a fourth sequence having a structure which is substantially identical to the structure of the third sequence.

4. A tele-location system as claimed in claim 1, wherein in said control circuit comprises a validation circuit for adjusting said control circuit to the valid state during a predetermined period of time.

5. A tele-location system as claimed in claim 1, in which said repeaters have a blocking circuit for blocking signals to be transmitted by way of the forward path, said control circuit being arranged to cause looping of the repeater on reception of said second sequence, to cause unlooping of the repeater on reception of the first short pulse of said third sequence and, in cooperation with said blocking circuit, to cause the conversion of said first pulse of said third sequence into a pulse having a duration corresponding to the duration of the pulse of said second sequence by interrupting the transmitted carrier signals.

6. A tele-location system as claimed in claim 5, wherein said control circuit includes a first gate which only in the valid state of the control circuit passes the signal at the output of the carrier detector to the input of an integrating network in said control circuit and to a first input of an RS-flip-flop in said control circuit, the second input of which is connected to the output of the integrating network in said control circuit, and further includes a second gate a first input of which is connected to the output of the carrier detector and a second input of which is coupled to the output of said RS flip-flop through a differentiating network in said control circuit, the output of said RS flip-flop being connected to a control input of the loop circuit and the output of said second gate being connected to a control input of said blocking circuit.

7. A tele-location system as claimed in claim 4, wherein said validation circuit is formed by a pump circuit having a pnp-transistor the base of which is connected to the emitter through a diode, the emitter of which is connected to the output of said carrier detector through a first capacitor in said pump circuit and the collector of which is connected to a voltage reference point through the parallel arrangement of a second capacitor and a resistor in said pump circuit, the collector being the ouput of the pump circuit.

8. A tele-location system as claimed in claim 1, in which the regenerator for the forward path in every repeater comprises an amplitude detector for said information signals in said forward path, wherein said carrier detector is formed by said amplitude detector.

9. A tele-location system as claimed in claim 1 in which the regenerator for the forward path in every repeater comprises a detector for detecting the presence of regenerated clock signals, wherein said carrier detector is formed by said presence detector.

* * * * *